(12) United States Patent
Fröhlich et al.

(10) Patent No.: US 10,608,485 B2
(45) Date of Patent: Mar. 31, 2020

(54) ROTOR FOR A PERMANENT-MAGNET EXCITED ELECTRICAL MACHINE

(71) Applicant: CONTINENTAL AUTOMOTIVE GMBH, Hannover (DE)

(72) Inventors: Holger Fröhlich, Berlin (DE); Isao Fukumoto, Berlin (DE)

(73) Assignee: Continental Automotive GmbH, Hannover (DE)

( * ) Notice: Subject to any disclaimer, the term of this patent is extended or adjusted under 35 U.S.C. 154(b) by 92 days.

(21) Appl. No.: 15/898,599

(22) Filed: Feb. 18, 2018

(65) Prior Publication Data

US 2018/0175683 A1  Jun. 21, 2018

Related U.S. Application Data

(63) Continuation of application No. PCT/EP2016/067902, filed on Jul. 27, 2016.

(30) Foreign Application Priority Data

Aug. 21, 2015 (DE) .................. 10 2015 216 051

(51) Int. Cl.
*H02K 1/27* (2006.01)
*H02K 15/03* (2006.01)

(52) U.S. Cl.
CPC ............. *H02K 1/276* (2013.01); *H02K 1/278* (2013.01); *H02K 15/03* (2013.01)

(58) Field of Classification Search
CPC ............ H02K 1/17; H02K 1/27; H02K 1/274; H02K 1/2746; H02K 1/276; H02K 1/2766; H02K 1/277; H02K 1/2773; H02K 1/278; H02K 1/28; H02K 15/03
See application file for complete search history.

(56) References Cited

U.S. PATENT DOCUMENTS

| | | | |
|---|---|---|---|
| 5,508,576 A | 4/1996 | Nagate et al. | |
| 5,581,140 A * | 12/1996 | Futami | H02K 1/276 310/156.53 |
| 6,798,103 B2 * | 9/2004 | Tajima | H02K 1/276 310/156.48 |

(Continued)

FOREIGN PATENT DOCUMENTS

| | | |
|---|---|---|
| CN | 1088364 A | 6/1994 |
| CN | 202713000 U | 1/2013 |
| CN | 103001356 A | 3/2013 |

(Continued)

OTHER PUBLICATIONS

Chinese Office Action dated Mar. 1, 2019 for corresponding Chinese application No. 201680042592.0.

(Continued)

*Primary Examiner* — Tran N Nguyen

(57) ABSTRACT

The disclosure relates to a rotor for a permanently excited electric machine. The rotor includes a holding pocket which is formed by a cutout of the rotor and which is designed to receive a permanent magnet. At least one flexible limb projects into the holding pocket of the rotor, and is designed to form an interference fit together with a circumferential boundary of the holding pocket and the permanent magnet arranged between the at least one flexible limb and the circumferential boundary.

4 Claims, 8 Drawing Sheets

(56) References Cited

U.S. PATENT DOCUMENTS

2014/0300243 A1* 10/2014 Berkouk .............. H02K 1/2773
                                                              310/216.048

FOREIGN PATENT DOCUMENTS

| DE | 69007243 T2 | 6/1994 |
| DE | 20201831 U1 | 4/2002 |
| DE | 10253950 A1 | 7/2003 |
| DE | 102005002332 A1 | 7/2006 |
| DE | 102005041676 A1 | 3/2007 |
| DE | 102005048731 A1 | 4/2007 |
| DE | 202009007544 U1 | 10/2010 |
| DE | 102010061778 A1 | 5/2012 |
| DE | 102012012911 A1 | 1/2013 |
| DE | 102012016927 A1 | 2/2014 |
| EP | 2249460 A1 | 11/2010 |
| EP | 2436100 A2 | 4/2012 |
| EP | 2437377 A1 | 4/2012 |
| JP | 2011125115 * | 6/2011 .............. H02K 1/27 |
| WO | 2009106569 A2 | 9/2009 |

OTHER PUBLICATIONS

International Search Report and Written Opinion dated Oct. 7, 2016 from corresponding International Patent Application No. PCT/EP2016/067902.
German Office Action dated Apr. 18, 2016 for corresponding German Patent Application No. 10 2015 216 051.3.

* cited by examiner

ROTOR FOR A PERMANENT-MAGNET EXCITED ELECTRICAL MACHINE

CROSS-REFERENCE TO RELATED APPLICATIONS

This application claims the benefit of PCT Application PCT/EP2016/067902, filed Jul. 27, 2016, which claims priority to German Application DE 10 2015 216 051.3, filed Aug. 21, 2015. The disclosures of the above applications are incorporated herein by reference.

TECHNICAL FIELD

The disclosure relates to a rotor for a permanently excited electric machine, where the rotor includes at least one holding pocket formed by a cutout of the rotor and designed to receive a permanent magnet.

BACKGROUND

In the production of electric motors in large unit quantities for hybrid vehicles, the installation, in particular the fixing, of the permanent magnets in the rotor represents a relatively great cost factor.

Use is very commonly made of adhesive bonding techniques, which necessitate cumbersome techniques during the installation process and in particular during a recycling process, for example during the separation of the permanent magnets from the rotor components. Such adhesive bonding techniques are known for example from DE 202 01 831.

Alternative methods provide clamping, for example by suitable clamping elements composed of plastic, or calking of the permanent magnets in a groove provided for them. Although such methods facilitate the recycling process, they are often difficult to implement in the installation process due to a lack of flexibility, because relatively large tolerances must be bridged. Technological background is thus known for example from DE 102 53 950 A1, DE 10 2005 041 676 A1, EP 2 436 100 B1, DE 10 2005 048 731 A1, EP 2 437 377 A1, DE 10 2012 016 927 A1 and EP 2 249 460 B1. In part, due to relatively weak interference fits, other methods under some circumstances do not provide adequate security against the permanent magnets loosening and falling out at high rotational speeds and under high vibration loads, such as may arise for example in the case of belt-type and crankshaft starter generators.

Furthermore, DE 10 2005 002 332 A1 has disclosed a rotor for a permanently excited electric machine which is suitable for use in an electric drive motor of a vehicle. Here, magnets are held in grooves of the rotor by interference fits. It is proposed that, in the region of the grooves, at least one recess adjacent to the groove be arranged at at least one point. It is sought thereby to achieve that the material in the region of the walls of the groove has a certain elasticity due to the recess arranged in the material. Such a recess corresponds in principle to a flexible beam clamped on both sides, which however under some circumstances exhibits a lack of flexibility insufficient to ensure easy and destruction-free or damage-free installation of the permanent magnets.

SUMMARY

The disclosure provides a rotor that includes at least one holding pocket formed by a cutout of the rotor and designed to receive a permanent magnet, by means of which the above-stated disadvantages can be eliminated. In particular, the disclosure provides a rotor which is of simple construction and which is inexpensive to produce and which permits exact and permanent fixing of the permanent magnets in the rotor even under high dynamic load, and which simplifies recycling of rare earths from electric motors.

The rotor according to the disclosure for a permanently excited electric machine includes a holding pocket which is formed by a cutout of the rotor and which is designed to receive a permanent magnet. At least one flexible limb, which projects into the holding pocket, of the rotor is designed to form an interference fit together with a circumferential boundary of the holding pocket and the permanent magnet arranged between the at least one flexible limb and the circumferential boundary.

Implementations of the disclosure may include one or more of the following optional features. In some implementations, the rotor includes several of the stated holding pockets, with at least one of the stated flexible limbs. In some examples, the flexible limb runs substantially parallel to the circumferential boundary and is situated opposite the latter, for example, radially opposite the latter. The flexible limb may be connected integrally to the rotor, for example directly at one side, such that the flexible limb forms, at the end on one side, an openly terminating end which projects into the holding pocket. Alternatively, the flexible limb may be indirectly integrally connected to the rotor, indirectly for example via a pedestal element, such that the flexible limb forms for example two openly terminating ends which are situated at opposite ends and which project into the holding pocket.

In other words, the geometry of the holding pocket for the permanent magnet is configured with at least one projection (flexible limb) which projects into the pocket region, or two such projections which project into the pocket region. The at least one material projection may be situated in the pocket geometry in the base region, or in the region arranged radially to the inside of the permanent magnet to be fixed. In mechanical terms, a material projection projecting into the pocket geometry corresponds to a beam which is clamped on one side and which is subjected to bending load. The advantage of such a beam clamped on one side lies in the particularly high degree of deformability or in a permitted improved fine adjustment of the interference fit by means of which the permanent magnet is fastened in the holding pocket. In some examples, with regard to the acting magnet tolerances, rotational speeds and vibrations, the rotor permits a flexurally rigid construction, which has a positive effect on correspondingly required force conditions for holding the permanent magnet in the rotor.

The bending load on the flexible limb may be adapted by the geometrical dimensions thereof such as length and width, and the interference fit may be implemented with a great overlap during the installation process. The flexible limbs are designed to deflect during the insertion of the permanent magnets into the holding pockets, to such an extent that the pressing-in of the permanent magnets is possible easily. Furthermore, due to the elasticity of the rotor material in the region of the flexible limbs, manufacturing tolerances of the permanent magnets can be compensated, such that there is no need for extremely high manufacturing accuracy and reworking by grinding during the production of the permanent magnets and/or of the holding pockets with flexible limb(s).

The installation process is greatly simplified, and a desired interference fit may nevertheless be maintained during the operation of the rotor, that is to say it is possible for relatively high forces to be transmitted by the interference fit in the case of large undersizes and also in the case of oversizes of the holding pocket and of the permanent magnet. Despite the different coefficients of thermal expansion of the rotor material and of the permanent magnet, it is thus possible to achieve secure hold of the permanent magnet in the holding pocket of the rotor even under particularly high loads and over a very large temperature range. In some implementations, tests carried out by the inventors have shown that the permanent magnets in a rotor according to the disclosure are held securely in the holding pockets of the rotor in temperature ranges between −40° C. and +200° C. under highly dynamic loads in the drive train of a motor vehicle despite all occurring dynamically fluctuating and in some cases very high rotational speeds and inevitable vibrations.

In some implementations, the geometry of the holding pocket is produced by punching, erosion, laser cutting or water-jet cutting of a rotor sheet. Typically, rotor sheets are correspondingly punched and are subsequently stacked to form a rotor sheet assembly, until a desired length of the rotor is achieved. Such a punching and stacking process is distinguished by its simplicity, where, aside from a required modification of a corresponding punching tool, no additional outlay arises with regard to costs and/or production time.

In some examples, at least one flexible limb is supported by a support. This has an advantageous effect on the deformation behavior of the flexible limb and on the stress distribution within the flexible limb, where the elasticity or the holding force of the flexible limb, and thus also the pressed-in permanent magnet, can be influenced by the support. In this way, secure hold of the permanent magnet in the holding pocket of the rotor can be ensured with regard to manufacturing tolerances both of the permanent magnet and of the holding pocket.

The form, design and arrangement of the flexible limb or of the flexible limbs may be configured in a variety of ways, such that designs of the rotor according to the disclosure which are adapted to the required force conditions for holding the magnet in the rotor are possible. For example, the elasticity or the holding force of the flexible limb on the pressed-in permanent magnet can be influenced through selection of a suitable length and width of the flexible limb and of the dimensioning of radii of the flexible limb. Here, the construction of the at least one flexible limb within the holding pockets may be configured such that the flexible limb is not deformed by centrifugal forces arising as a result of the rotation of the rotor, which could weaken the holding force on the permanent magnet. The forces generated by the at least one flexible limb thus press the permanent magnet into a position that the permanent magnet assumes under the action of centrifugal force. A movement of the permanent magnet within the holding pocket can thus be reliably prevented, whereby a high degree of quality of the balancing of the rotor is made possible.

Accordingly, in some examples, the rotor may include a flexible limb, such as a single flexible limb, which projects into the holding pocket from a radial boundary of the holding pocket. This example corresponds to a flexible limb oriented toward one side. The flexible limb may runs transversely with respect to the radial boundary and parallel to the circumferential boundary of the holding pocket, where a gap exists between an openly terminating end of the flexible limb and the oppositely situated radial boundary of the holding pocket. Here, the permanent magnet may lie at least in regions against the flexible limb and bend the latter radially inward slightly.

Furthermore, the rotor may include two flexible limbs which have in each case one freely terminating end, where the freely terminating ends face away from one another. This example may for include two outwardly protruding flexible limbs. In some examples, the flexible limbs run transversely with respect to a radial boundary, and parallel to the circumferential boundary, of the holding pocket. Furthermore, the flexible limbs may be fastened to an inner boundary, situated opposite the circumferential boundary, of the holding pocket by a pedestal, which is arranged substantially transversely with respect to the flexible limbs, of the rotor, where the flexible limbs may be connected integrally to one another and also integrally to the pedestal. Furthermore, the openly terminating ends of the two flexible limbs may be spaced apart from one of the radial boundaries of the holding pocket by a gap. In this example, the weight of the permanent magnet can be distributed particularly uniformly between both flexible limbs.

Furthermore, the rotor may include two flexible limbs which have one freely terminating end, where the freely terminating ends face toward one another. This example may for example include two inwardly protruding flexible limbs. In some examples, the flexible limbs run transversely with respect to two radial boundaries, from which they project, of the holding pocket and parallel to the circumferential boundary of the holding pocket, where the openly terminating ends of the two flexible limbs may be spaced apart from one another by a gap.

In some examples, the circumferential boundary runs in a closed manner. This example thus includes a holding pocket of closed design, where the holding pocket may be formed as an axially closed channel within the rotor. Such a closed holding pocket makes it possible for the permanent magnet to be held particularly securely in the holding pocket.

In some implementations, the circumferential boundary runs in an interrupted manner. The holding pocket may for example be formed as an open holding pocket with an axial groove on an outer circumference of the rotor. Such an open holding pocket is of particularly material-saving design and makes it possible for a narrow gap to be provided between the rotor and a stator surrounding said rotor.

The achievable torque of an electric machine is significantly dependent on the width of the radial air gap between the permanent magnets attached to the rotor and the stator poles, where the air gap is dimensioned to be as narrow as possible in order to achieve high efficiency. The structural design of the magnet holder structure is thus of major importance with regard to the operational reliability and efficiency of a machine of the type. In some examples, the holding pocket includes a dovetail-shaped cutout of the rotor. This example permits a direct arrangement of a permanent magnet on the outer circumferential surface of the rotor. By the flexible limb within the holding pocket, it can be ensured that the permanent magnet can be arranged in a predetermined, reproducible position on the rotor yoke without further installation elements or auxiliary installation materials.

Furthermore, the rotor may include two flexible limbs running substantially parallel to the circumferential boundary, and/or two flexible limbs running substantially vertically with respect to the circumferential boundary.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
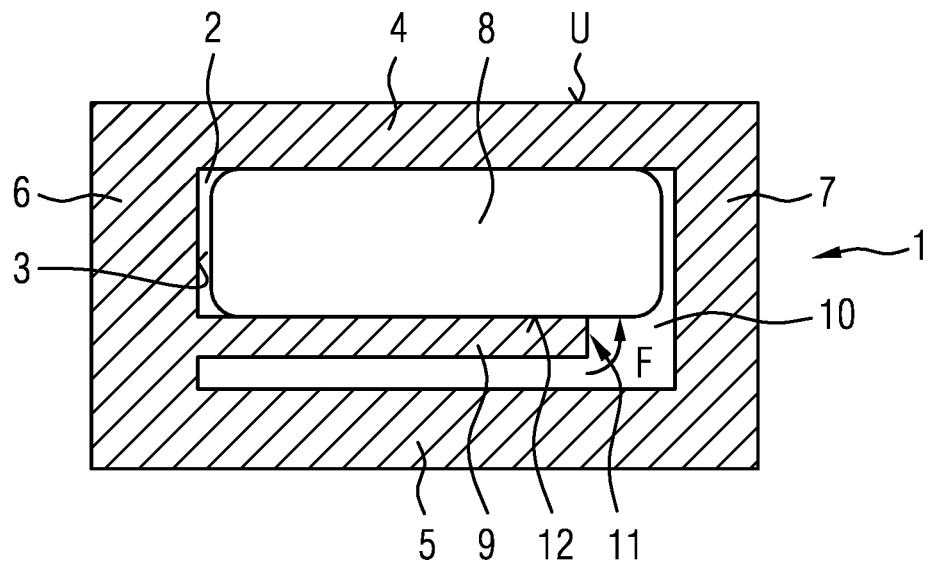
FIGS. 1-5 show in each case a schematic partial sectional illustration of an exemplary rotor.

FIG. 1 shows a part of a rotor 1 of a permanently excited electric machine (not illustrated in any more detail) in the region of its outer circumference U. The rotor 1 includes a holding pocket 2, which is formed by a cutout 3 of the rotor 1. The holding pocket 2 is delimited by a circumferential boundary 4 which runs in a closed manner, by an inner boundary 5 which is situated opposite the circumferential boundary 4, by a first radial boundary 6 illustrated on the left in FIG. 1, and by a second radial boundary 7 which is situated opposite the first radial boundary 6. The holding pocket 2 receives a permanent magnet 8. Despite being illustrated in straight form for the sake of simplicity in FIG. 1, the outer circumference U of the rotor 1 runs in a circular manner.

A single flexible limb 9 is integrally connected to the first radial boundary 6 and projects into the holding pocket 2. The example thus includes a flexible limb 9 which is oriented toward one side. The flexible limb 9 runs transversely with respect to the radial boundaries 6, 7 and parallel to the circumferential boundary 4 and the inner boundary 5, where a gap 10 exists between an openly terminating end 11 of the flexible limb 9 and the second radial boundary 7. The substantially cuboidal permanent magnet 8 lies with a major part of its bottom side 12 on the flexible limb 9, which forms an interference fit together with the circumferential boundary 4 of the holding pocket 2 and the permanent magnet 8 arranged between the flexible limb 9 and the circumferential boundary 4. The flexible limb 9 presses the permanent magnet 8 with a force into a position which the permanent magnet 8 would assume under the action of centrifugal force during rotation of the rotor 1, as indicated by the arrow F.

Figure 2:
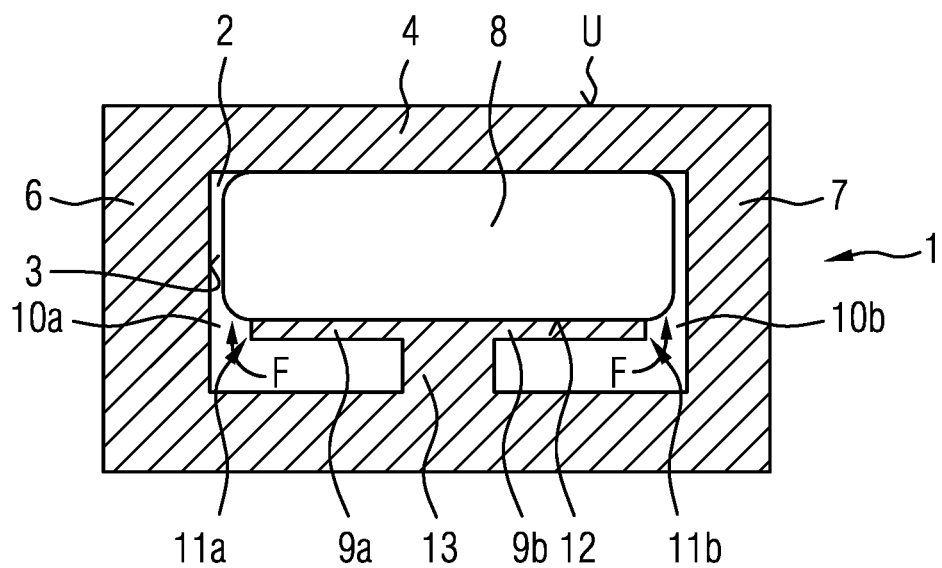

FIG. 2 shows a rotor 1 which is similar to the rotor shown in FIG. 1 and which differs therefrom by the design of the flexible limb. The rotor 1 includes two flexible limbs 9a, 9b which have in each case one freely terminating end 11a, 11b, which ends face away from one another. This example thus has two outwardly protruding flexible limbs 9a, 9b. The flexible limbs 9a, 9b run transversely with respect to the radial boundaries 6, 7 and parallel to the circumferential boundary 4 and to the inner boundary 5 of the holding pocket 2. As shown, the flexible limbs 9a, 9b are integrally connected to one another, that is to say, a single flexible limb is provided which includes the partial flexible limbs 9a, 9b. The flexible limbs 9a, 9b are furthermore indirectly fastened integrally to the inner boundary 5 via a pedestal 13, which is arranged transversely with respect to the inner boundary and the flexible limbs 9a, 9b, of the rotor 1.

Furthermore, the openly terminating ends 11a, 11b of the two flexible limbs 9a, 9b are spaced apart in each case by a gap 10a, 10b from the first radial boundary 6 and from the second radial boundary 7 of the holding pocket 2 respectively. The substantially cuboidal permanent magnet 8 lies in each case with its bottom side 12 on the flexible limbs 9a, 9b to equal extents. As such, the weight of the permanent magnet 8 is distributed uniformly between the two flexible limbs 9a, 9b, which form an interference fit together with the circumferential boundary 4 of the holding pocket 2 and the permanent magnet 8 arranged between the flexible limbs 9a, 9b and the circumferential boundary 4. The flexible limbs 9 press the permanent magnet 8 with a force into a position which the permanent magnet 8 would assume under the action of centrifugal force during rotation of the rotor 1, as indicated by the arrows F.

Figure 3:
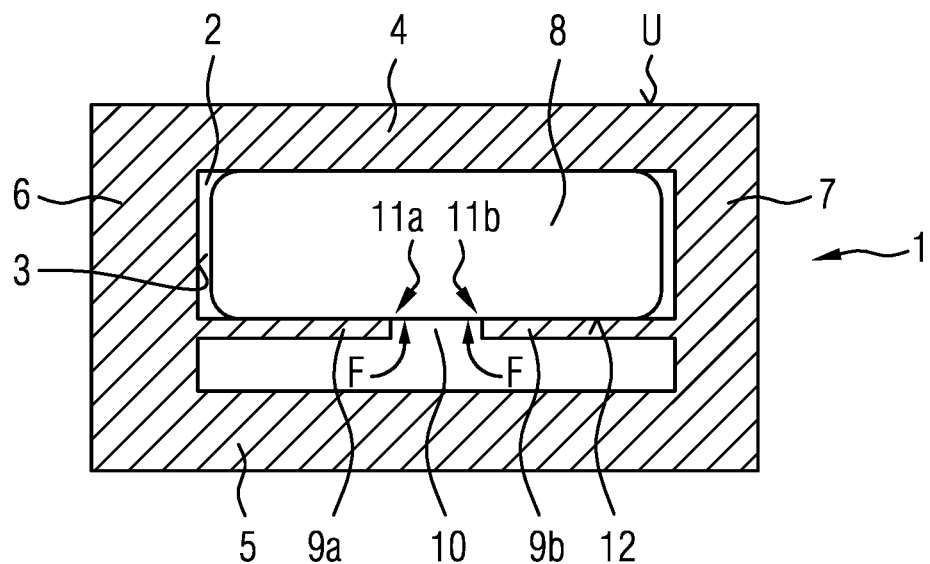

FIG. 3 shows a rotor 1 which is similar to the rotor shown in FIG. 1 and which differs therefrom by the design of the flexible limb. The rotor 1 includes two flexible limbs 9a, 9b which have in each case one freely terminating end 11a, 11b, where the freely terminating ends 11a, 11b face toward one another. This example thus includes two inwardly protruding flexible limbs 9a, 9b. The flexible limbs 9a, 9b run transversely with respect to the first radial boundary 6 and the second radial boundary 7, from which they project, and parallel to the circumferential boundary 4 and the inner boundary 5 of the holding pocket 2, where the openly terminating ends 11a, 11b of the two flexible limbs 9a, 9b are spaced apart from one another by a gap 10. The substantially cuboidal permanent magnet 8 lies in each case with its bottom side 12 on the flexible limbs 9a, 9b to equal extents, such that the weight of the permanent magnet 8 is distributed uniformly between the two flexible limbs 9a, 9b, which form an interference fit together with the circumferential boundary 4 of the holding pocket 2 and the permanent magnet 8 arranged between the flexible limbs 9a, 9b and the circumferential boundary 4. The flexible limbs 9 press the permanent magnet 8 with a force into a position which the permanent magnet 8 would assume under the action of centrifugal force during rotation of the rotor 1, as indicated by the arrows F.

Figure 4:
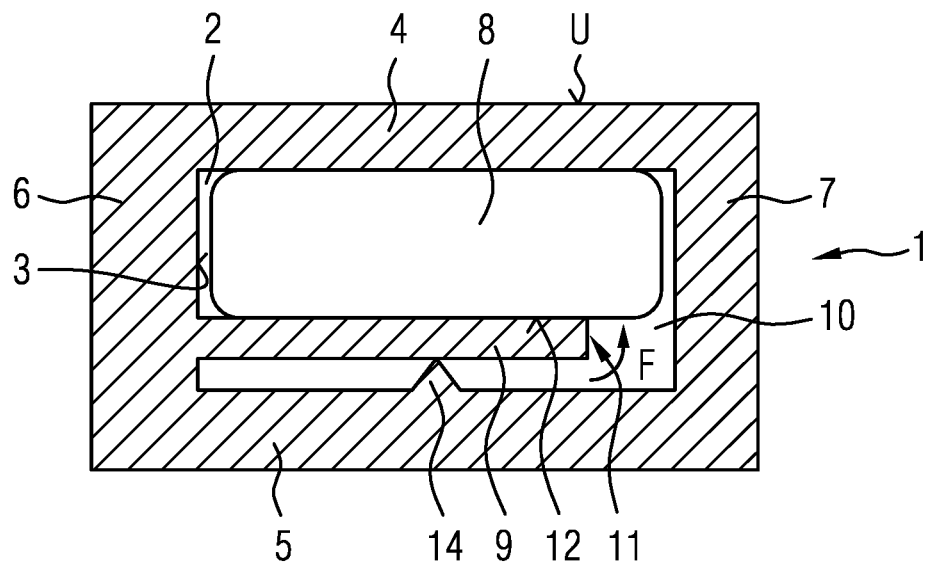

FIG. 4 shows a rotor 1 which is similar to the rotor as per FIG. 1 and which differs therefrom in that the flexible limb 9 is supported by a support 14 which is of triangular cross section and which is connected integrally to the inner boundary 5, from which the support 14 projects. The tip of the support 14 and the flexible limb 9 are not directly fixedly connected to one another.

Figure 5:
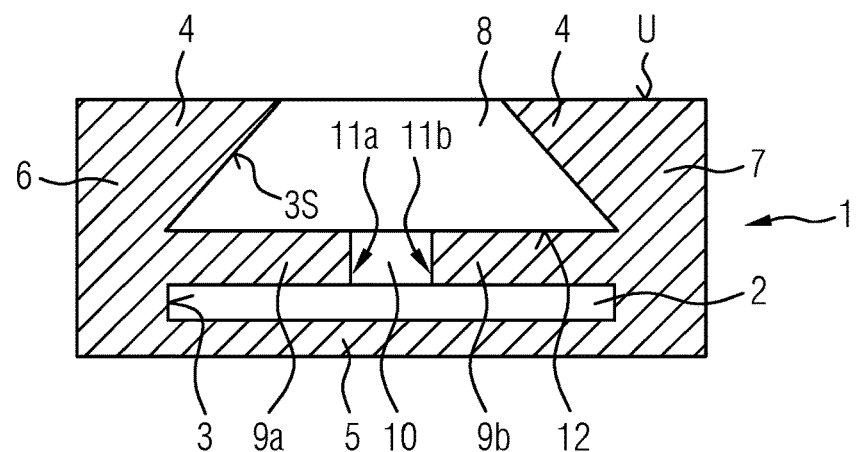

FIG. 5 shows a part of a further rotor 1 of a permanently excited electric machine (not illustrated in any more detail) in the region of its outer circumference U. The rotor 1 includes a holding pocket 2 which is of partially open configuration in the region of the outer circumference and which is formed by a cutout 3 of the rotor 1. The holding pocket 2 is delimited by a circumferential boundary 4 which runs in a partially open or interrupted manner, by an inner boundary 5 which is situated opposite the circumferential boundary 4, by a first radial boundary 6 illustrated on the left in FIG. 5, and by a second radial boundary 7 which is situated opposite the first radial boundary 6. The radial boundaries 6, 7 converge in the direction of the outer circumference U of the rotor 1, such that the holding pocket 2 includes a dovetail-shaped cutout 3S of the rotor 1, where the dovetail-shaped cutout 3S forms a part of the cutout 3 as a whole. Furthermore, in the example shown, the radial boundaries 6, 7 transition in each case into a section of the circumferential boundary 4, that is to say the interrupted circumferential boundary 4 is integrated into the radial boundaries 6, 7.

The holding pocket 2 receives a trapezoidal permanent magnet 8 which fits together with the dovetail-shaped cutout 3S. Despite being illustrated in straight form for the sake of simplicity in FIG. 5, the outer circumference U of the rotor 1 runs in a circular manner. The rotor 1 includes two flexible limbs 9a, 9b which have in each case one freely terminating end 11a, 11b, where the freely terminating ends 11a, 11b face toward one another. This example thus includes two inwardly protruding flexible limbs 9a, 9b. The flexible limbs 9a, 9b project from the first radial boundary 6 and the second radial boundary 7 and run parallel to the inner boundary 5 of the holding pocket 2, where the openly terminating ends 11a, 11b of the two flexible limbs 9a, 9b are spaced apart from one another by a gap 10. The trapezoidal permanent magnet 8 lies with its bottom side 12 on the flexible limbs 9a, 9b to equal extents, such that the weight of the permanent magnet 8 is distributed uniformly between the two flexible limbs 9a, 9b, which form an interference fit together with the circumferential boundary 4 of the holding pocket 2 and the permanent magnet 8 arranged between the flexible limbs 9a, 9b and the circumferential boundary 4. The flexible limbs 9 press the permanent magnet 8 with a force into a position which the permanent magnet 8 would assume under the action of centrifugal force during rotation of the rotor 1, as indicated by the arrows F.

Figure 6:
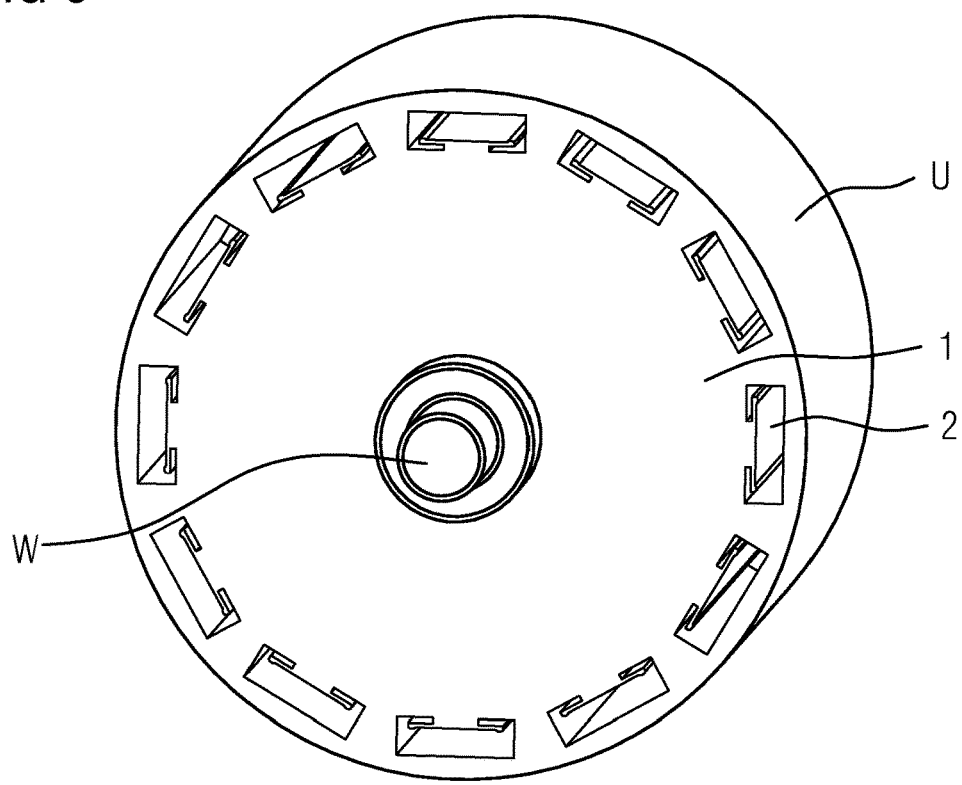
FIG. 6 shows a perspective view of an exemplary rotor with closed holding pockets.
Figure 7:
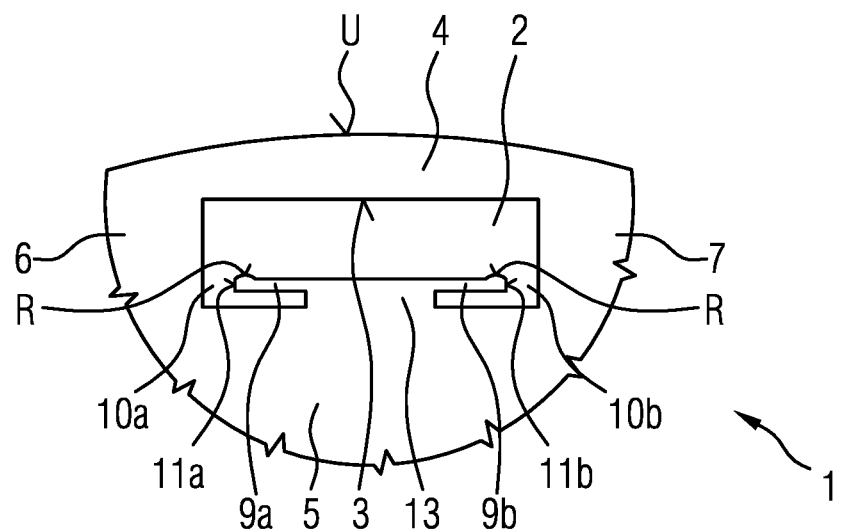
FIG. 7 shows an enlarged side view of one of the holding pockets from FIG. 6.

FIGS. 6 and 7 show a rotor 1 with a rotor shaft W and with closed holding pockets, where the holding pockets and flexible limbs are similar to those of the rotor as per FIG. 2, and differ therefrom substantially by further details of the flexible limbs 9a, 9b, which each have a radius R at their openly terminating ends 11a, 11b. Furthermore, no permanent magnet is illustrated in FIGS. 6 and 7.

Figure 8:
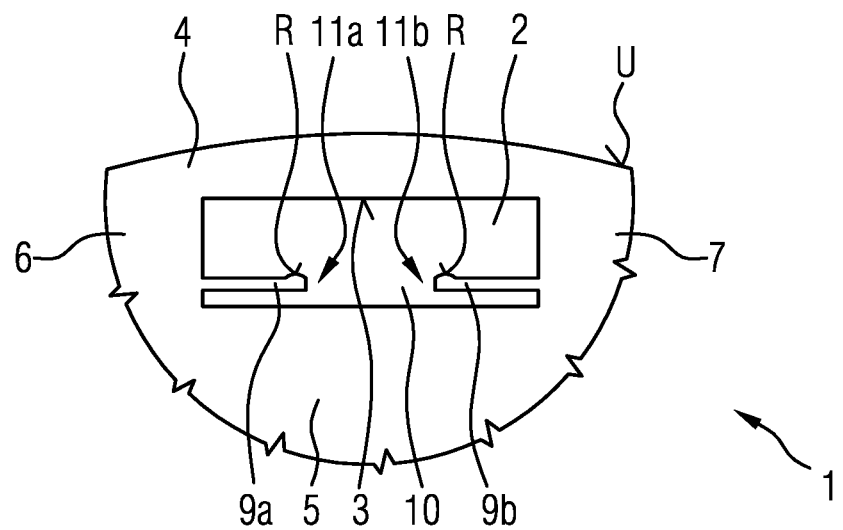
FIG. 8 shows a partial side view of an exemplary rotor with inwardly directed flexible limbs.

FIG. 8 shows a rotor 1 which is similar to the rotor shown in FIG. 3 and which differs therefrom substantially by the configuration of the flexible limbs 9a, 9b, which each additionally have a radius R at their openly terminating ends 11a, 11b. Furthermore, no permanent magnet is illustrated in FIG. 8.

Figure 9:
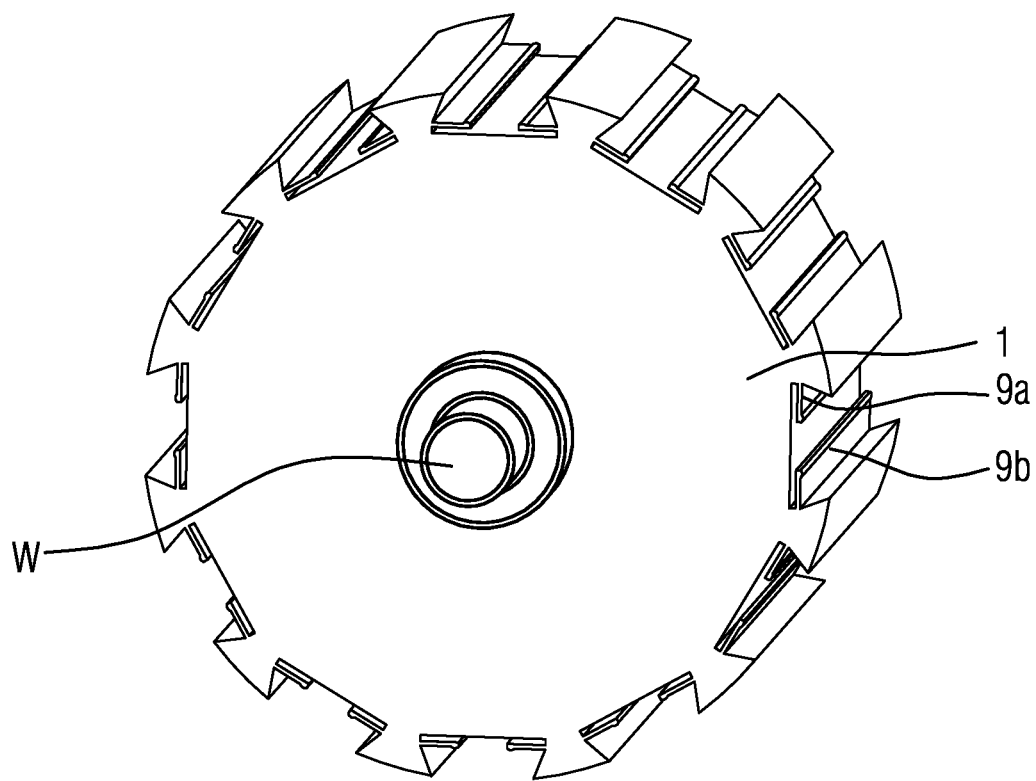
FIG. 9 shows a perspective view of an exemplary rotor with open holding pockets.
Figure 10:
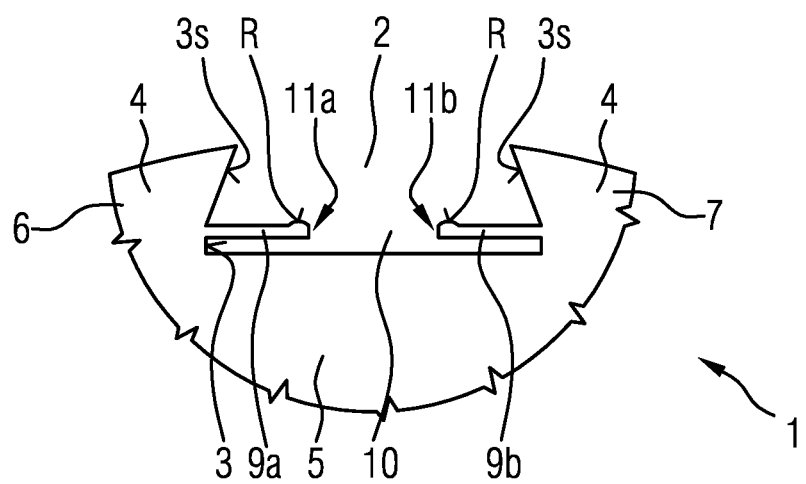
FIG. 10 shows an enlarged side view of one of the holding pockets from FIG. 9.

FIGS. 9 and 10 show a rotor 1 with a rotor shaft W, where the rotor 1 is similar to the rotor as per FIG. 5 with holding pockets 2 of partially open configuration in the region of the outer circumference U of the rotor 1, and differs therefrom substantially by the configuration of the flexible limbs 9a, 9b, which each additionally have a radius R at their openly terminating ends 11a, 11b. Furthermore, no permanent magnet is illustrated in FIGS. 9 and 10.

Figure 11:
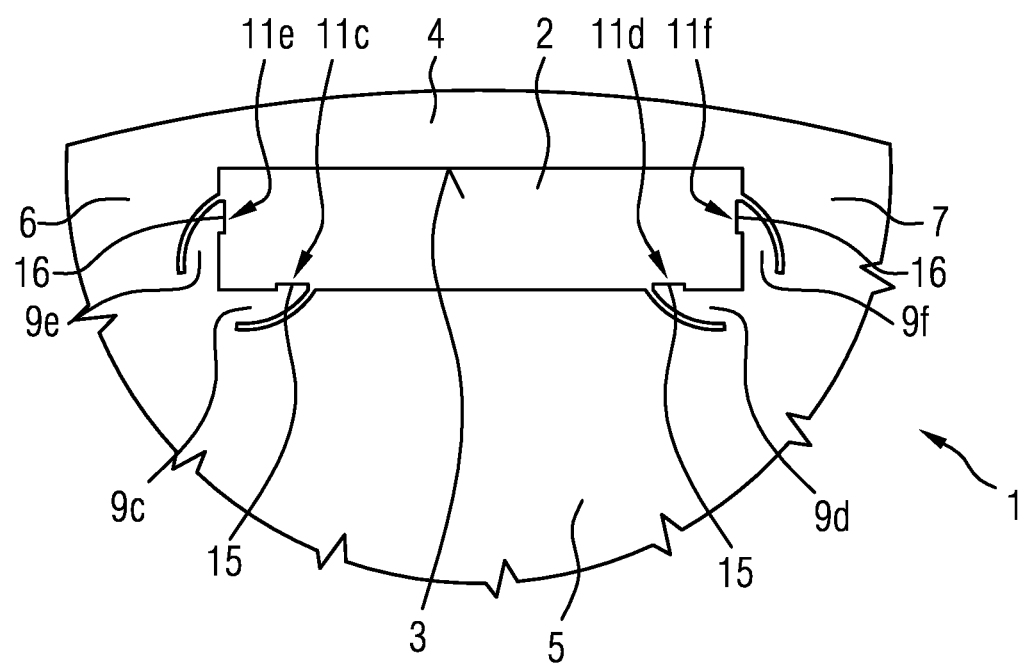
FIG. 11 shows a partial side view of an exemplary rotor with horizontal and vertical flexible limbs.
Figure 12:
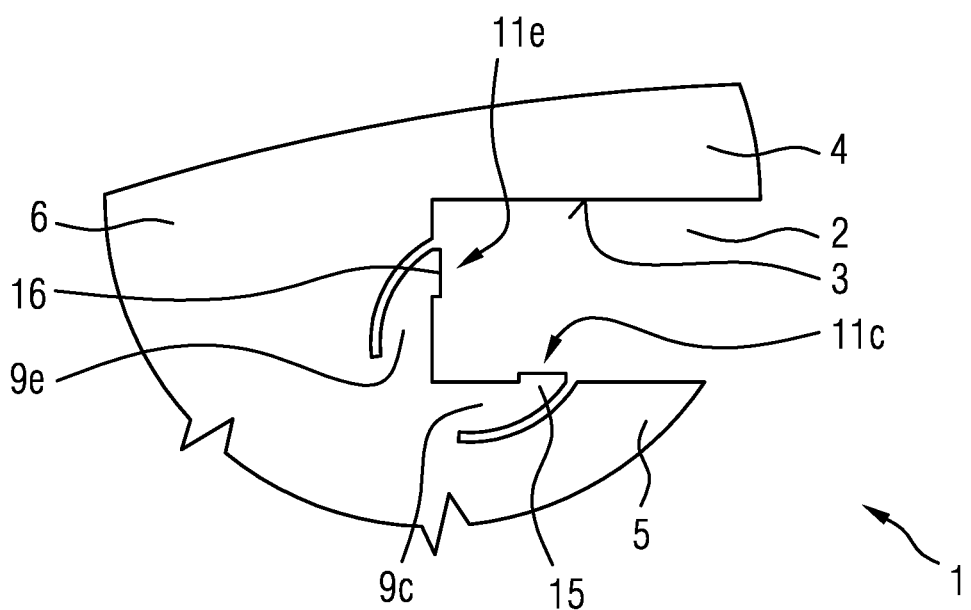
FIG. 12 shows an enlarged side view of the left-hand part of the holding pocket from FIG. 11.

FIGS. 11 and 12 show a part of a rotor 1 of a permanently excited electric machine (not illustrated in any more detail) in the region of its outer circumference U. The rotor 1 includes a holding pocket 2, which is formed by a cutout 3 of the rotor 1. The holding pocket 2 is delimited by a circumferential boundary 4 which runs in a closed manner, by an inner boundary 5 which is situated opposite the circumferential boundary 4, by a first radial boundary 6 illustrated on the left in FIG. 11, and by a second radial boundary 7 which is situated opposite the first radial boundary 6. The holding pocket 2 is designed to receive a permanent magnet (not illustrated).

The rotor 1 includes two circumferential flexible limbs 9c, 9d running substantially parallel to the circumferential boundary 4 and two radial flexible limbs 9e, 9f running substantially vertically with respect to the circumferential boundary 4, where in each case one circumferential flexible limb 9c or 9d and in each case one radial flexible limb 9e or 9f respectively adjoin one another, are oriented substantially perpendicular to one another and transition into one another. The four flexible limbs 9c to 9f are in each case integrally connected to one of the radial boundaries 6 or 7 and to the inner boundary 5. The circumferential flexible limbs 9c, 9d have in each case one freely terminating end 11c and 11d respectively, which are directed toward one another. The ends 11c, 11d form in each case one projection 15 which projects radially into the holding pocket 2 and which is designed to form an interference fit together with the circumferential boundary 4 and the permanent magnet that can be arranged between the radial projections 15 and the circumferential boundary 4.

The radial flexible limbs 9e, 9f likewise have in each case one freely terminating end 11e and 11f respectively, which are oriented in the same direction. The ends 11e, 11f form in each case one projection 16 which projects into the holding pocket 2 parallel to the circumferential direction U of the rotor and which is designed to form an interference fit together with the projection 16 of the respective other radial flexible limb 9e or 9f and the permanent magnet that can be arranged between the radial projections 16. Thus, the four flexible limbs make it possible for the permanent magnet to be held particularly securely, in the manner of an interference fit, in the circumferential direction and in the radial direction.

Figure 13:
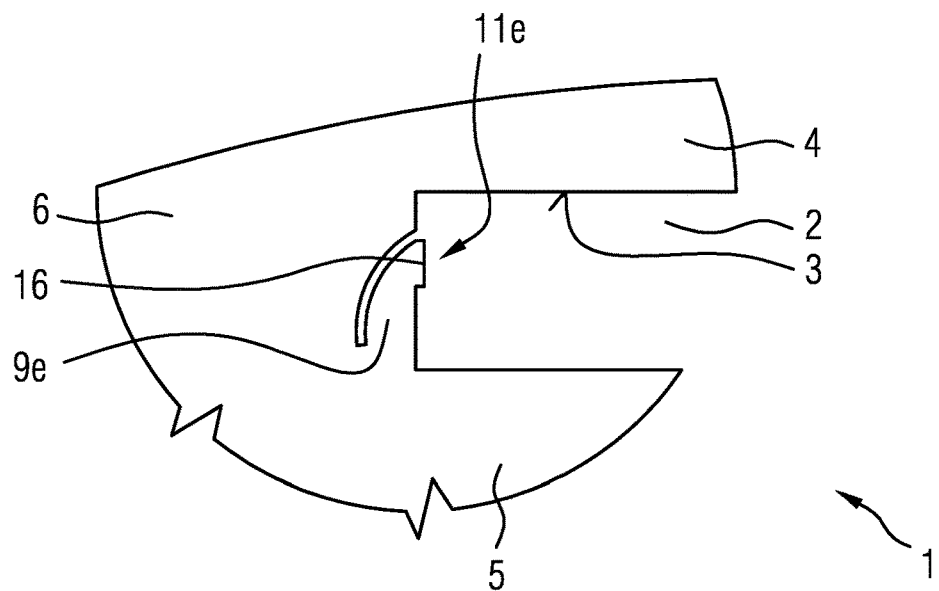
FIG. 13 shows a partial side view of an exemplary rotor with a horizontal flexible limb.

FIG. 13 shows a part of a holding pocket 2 of a rotor 1, which is similar to the holding pocket 2 shown in FIG. 12 but which includes only two radial flexible limbs running substantially vertically with respect to the circumferential boundary 4 and no circumferential flexible limbs, where only one of the flexible limbs 9e is shown in FIG. 13.

Figure 14:
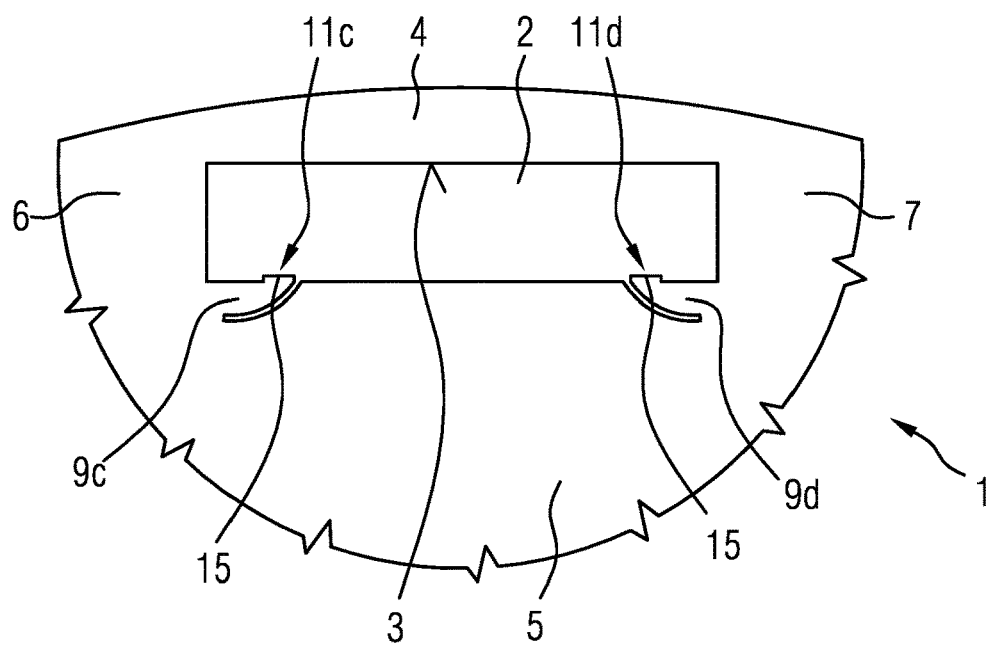
FIG. 14 shows a partial side view of an exemplary rotor with a closed holding pocket.

FIG. 14 shows a part of a rotor 1 with a closed holding pocket 2, where the rotor 1 is similar to the rotor shown in FIG. 11 but includes only two circumferential flexible limbs 9c, 9d running substantially parallel to the circumferential boundary 4, and no radial flexible limbs.

Figure 15:
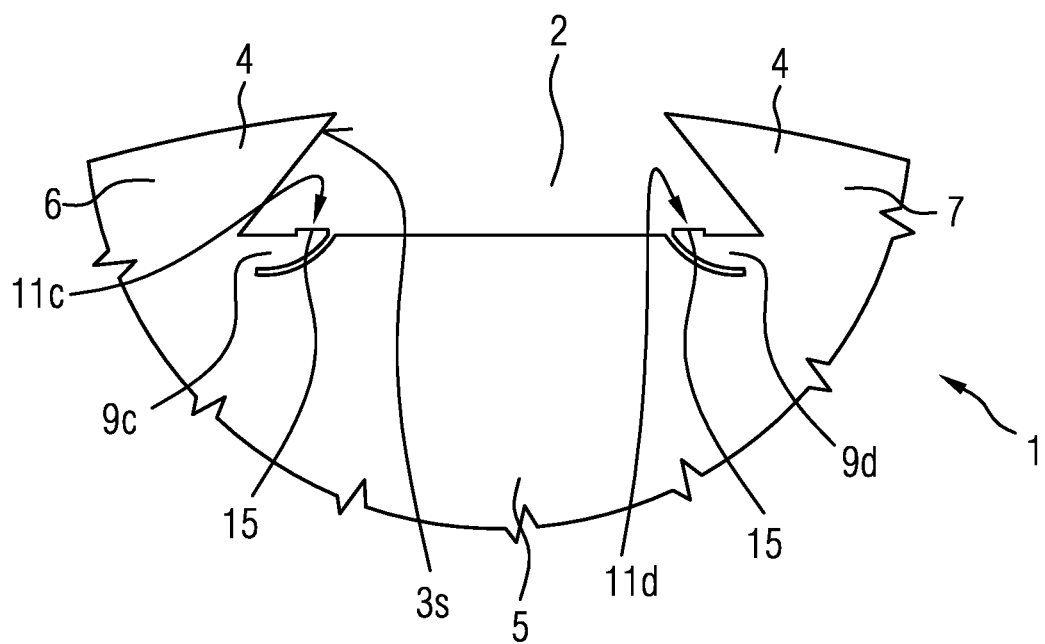
FIG. 15 shows a partial side view of an exemplary rotor with an open holding pocket.

FIG. 15 shows a part of a rotor 1 which is similar to the rotor as per FIG. 14 and which differs therefrom by an open holding pocket 2, similarly to that shown by FIGS. 5 and 10, with a dovetail-shaped cutout 3s of the rotor 1.

A number of implementations have been described. Nevertheless, it will be understood that various modifications may be made without departing from the spirit and scope of the disclosure. Accordingly, other implementations are within the scope of the following claims.

What is claimed is:

1. A rotor for a permanently excited electric machine, the rotor comprising:
   a holding pocket formed by a cutout of the rotor and designed to receive a permanent magnet; and
   at least one flexible limb projects into the holding pocket and designed to form an interference fit together with a circumferential boundary of the holding pocket and the permanent magnet arranged between the at least one flexible limb and the circumferential boundary,
   a support supporting the at least one flexible limb, the support is connected integrally to an inner boundary, wherein the support projects from the inner boundary, the support comprising a tip wherein the tip of the support and the flexible limb are not directly fixedly connected to one another, wherein one end of the flexible limb is integrally connected to a radial boundary and another end of the flexible limb is a free end.

2. The rotor of claim 1, wherein the at least one flexible limb is supported by a support.

3. The rotor of claim 1, wherein the at least one flexible limb projects into the holding pocket from a radial boundary of the holding pocket.

4. The rotor of claim 1, wherein the circumferential boundary runs in a closed manner.

* * * * *